United States Patent
Hu et al.

(10) Patent No.: US 11,948,258 B2
(45) Date of Patent: Apr. 2, 2024

(54) REMOTE MONITORING METHOD BASED ON INFORMATION FUSION AND VIRTUAL REALITY FOR MARINE ENGINE ROOM

(71) Applicant: Shanghai Maritime University, Shanghai (CN)

(72) Inventors: Yihuai Hu, Shanghai (CN); Jiawwei Jiang, Shanghai (CN); Lei Guo, Shanghai (CN)

(*) Notice: Subject to any disclaimer, the term of this patent is extended or adjusted under 35 U.S.C. 154(b) by 53 days.

(21) Appl. No.: 17/837,912

(22) Filed: Jun. 10, 2022

(65) Prior Publication Data
US 2022/0366657 A1    Nov. 17, 2022

(51) Int. Cl.
| | |
|---|---|
| G06T 15/00 | (2011.01) |
| G06T 19/00 | (2011.01) |
| G06V 20/52 | (2022.01) |
| H04L 67/12 | (2022.01) |

(52) U.S. Cl.
CPC ............ G06T 19/006 (2013.01); G06V 20/52 (2022.01); H04L 67/12 (2013.01); *G06F 2218/08* (2023.01); *G06T 2200/08* (2013.01)

(58) Field of Classification Search
CPC ........ G06V 20/00; G06V 20/52; Y02A 10/40; G06T 2200/08; G06T 19/006; G06F 2218/08; H04L 67/12
USPC ........................................................ 345/418
See application file for complete search history.

(56) References Cited

U.S. PATENT DOCUMENTS

| | | | |
|---|---|---|---|
| 11,010,975 B1* | 5/2021 | Doptis | ................... A63F 13/803 |
| 2019/0204824 A1* | 7/2019 | Micros | ................... G05D 1/101 |

OTHER PUBLICATIONS

Chao H, Cao Y, Chen Y. Autopilots for small fixed-wing unmanned air vehicles: A survey. In2007 International Conference on Mechatronics and Automation Aug. 5, 2007 (pp. 3144-3149). IEEE.*
Shakeri R, Al-Garadi MA, Badawy A, Mohamed A, Khattab T, Al-Ali AK, Harras KA, Guizani M. Design Challenges of Multi-UAV Systems in Cyber-Physical Applications: A Comprehensive Survey and Future Directions. IEEE Communications Surveys & Tutorials. Oct. 2019;21(4):3340-85.*
Usul, Virtual Engine Room (VER) Main Engine Start, Oct. 17, 2015; https://www.youtube.com/watch?v=d2sKCrJrpT4.*

* cited by examiner

*Primary Examiner* — Phu K Nguyen
(74) *Attorney, Agent, or Firm* — Lei Jiang, LLC; Lei Jiang

(57) ABSTRACT

The present invention discloses a remote monitoring method based on information fusion and virtual reality for a marine engine room, comprising five step s: step 1: employing sensors to collect thermodynamic parameters; step 2-1: using normalized relative deviation analysis method to obtain symptoms of the thermodynamic parameters; step2-2: using multi-scale time domain averaging method to extract signatures of vibration & noise signals; step 2-3: using projection moment method to describe dynamic characteristics of static pictures and infrared thermal images of equipment in the engine room; step 3: extracting features in the performance parameters and infrared thermal images; step 4: transmitting the analyzed results; and step 5: establishing visual 3D scenes of the marine engine room. The method rebuilds 3D interactive scenes of the marine engine room and realizes 3D animation effectively.

1 Claim, 2 Drawing Sheets

REMOTE MONITORING METHOD BASED ON INFORMATION FUSION AND VIRTUAL REALITY FOR MARINE ENGINE ROOM

The present invention claims priority benefit of CN113395491A, filed on Jun. 11, 2021, the entirety of which being incorporated by reference herein.

FIELD OF INVENTION

The present invention relates to the technical field of ship automation, in particular to a remote monitoring method based on information fusion and virtual reality for the marine engine room of autonomous unmanned ships.

BACKGROUND ART

In recent years, with the deep integration of cutting-edge technologies such as artificial intelligence, big data, cyber internet, virtual reality and traditional ships, the ship technology is developing from automation to autonomy. The application of ship autonomy technology will trigger a technological revolution of ship industry, and the concepts of shore-based remote control and autonomous unmanned ships appear, which will bring new opportunities and challenges to the development of ship technology in the future.

It is very important for operators of ships navigating autonomously at sea to know the operation of internal systems and equipment in marine engine room in time. At present, ocean-going ships have mainly realized ship-shore communication by means of maritime satellites. The signals such as temperature, pressure, running speed, flow velocity, oil mist concentration, liquid level of the main engine and auxiliary engines in marine engine room could be sent from the ship to shore-based monitoring terminals for working conditions monitoring in the whole engine room. The traditional monitoring method, such as Chinese patent (CN110397584A[P]2019-07-19) relating to a monitoring method, is mainly composed of three parts: (1) sensors distributed at various monitoring points in the engine room. (2) control consoles, monitoring instruments and monitoring screens installed in a centralized control room. (3) extended alarm boxes installed on bridge, public places, chief engineer's room and engineer's room. Generally, it has several functions such as data acquisition, acousto-optic alarm, parameter and status display, alarm record printing and extended alarm. However, the monitoring method are only limited to out-of-limit thermal parameters alarm and there is no vibration, noise, image and video information, which cannot meet the requirements of remote monitoring ashore for unmanned ships.

The traditional monitoring method is obviously not suitable for remotely operated autonomous ships, especially this method cannot receive the actual operation situation of marine equipment in the engine room. If the maritime satellite is used to continuously send images or video from ship to shore, the communication data will be very large and the communication cost will be very high. It is neither intuitive nor convenient to send all necessary information ashore. Because there will be no engineer on duty in autonomous ships, the existing monitoring method cannot meet the requirements to monitor the condition of autonomous ships and shore-based remote management and control mode will be adopted.

Therefore, it is necessary to have a new type of remote monitoring method for marine engine room, which can integrate multi-source information and utilize 3D virtual reality technology to achieve an immersive remote monitoring and meet the requirements of real-time alarm, so that operators on shore can know the running condition of equipment in the marine engine room more intuitively.

SUMMARY OF THE INVENTION

In view of the afore-mentioned reasons, in order to achieve monitoring of marine engine room, the present invention provides a method based on information fusion and virtual reality for remote monitoring of marine engine room.

The method makes use of a remote monitoring system mainly composed of four parts: (1) data acquisition module; (2) feature extraction module; (3) data transmission module; (4) monitoring terminal. The data acquisition module includes engine room cameras, infrared thermal imagers, acceleration sensors, temperature sensors, pressure sensors, level sensors and data acquisition cards; The feature extraction module includes a computer and two software: infrared thermograms feature extraction by means of projection moment method and vibration & noise feature extraction by means of multi-scale time domain averaging method. The data transmission module includes maritime satellite, server and client computer and a communication software; The monitoring terminal is a shore-based monitoring terminal, which contains 3D display workstation, data storage hard disk and other auxiliary devices.

The remote monitoring method based on information fusion and virtual reality for a marine engine room of the present invention comprises the following steps:

Step1: Information acquisition. The marine engine room data is collected by engine room cameras, infrared thermal imagers, acceleration sensors, temperature sensors, pressure sensors and level sensors; The data acquisition cards transfer sensors' data to host computer; Connecting signal lines between the host computer and any data acquisition card; Connecting signal lines between data acquisition card and sensors; Connecting signal lines between engine room cameras and infrared thermal imagers to host computer; Supplying power supply via the power source to the host computer, the data acquisition card, the engine room cameras and the infrared thermal imagers; and then turning on a power source;

Step2: Data analysis. Using normalized relative deviation analysis method to get symptoms of the diesel engine thermodynamic parameters; the specific process includes: set the parameter x to the normal scale of x0 under normal condition $\varepsilon=(x-x0)/x0$, where x and x0 are the thermodynamic parameters of the diesel engine model under failure and normal conditions, respectively. Then the relative deviation is normalized to the reference condition (that is 286° K. engine room temperature) according to the actual engine room temperature t ° K. $\varepsilon'=(t-286)\times\varepsilon/114$. Finally the normalized thermodynamic parameter will be $x'=x/(1+\varepsilon')$; using multi-scale time domain averaging method to extract features of the vibration & noise signals; the specific process includes: set the vibration signal z(t) of marine rotating machinery to contain multiple periodic signals y(t), $z(t)=y(t)+e(t)$, y(t) is a signal composed of r different periodic signals, and e(t) is an error parameter; under the condition of constant speed, the number of samples between any two punctuations is a fixed value in, with in as the size of sub-signal array, z(t) is divided into p segments, the sampling signal of vibration signal is z(n), and the algorithm formula of time domain synchronous averaging is as follows:

$$\bar{z}(n) = \frac{1}{p}\sum_{r=0}^{p-1} z(n-rM).$$

Using projection moment to describe the dynamic characteristics of images. The process includes superimposing several infrared thermograms in sliding time window on a projection plane. The extracted feature results are saved in the host computer.

Step3: Feature extraction. Using transient impact signal analysis, instantaneous speed analysis, multi-scale time domain averaging and fuzzy entropy feature extraction methods to extract features of signal waveforms in multiple periods, retain fault features at all frequencies, and remove redundant information in the 3D display workstation, in order to monitor ship collisions, rock hitting, machine loosening, propeller falling off and abnormal equipment operation accidents in the marine engine room.

Step4: Data transmission of the results to the shore-based monitoring terminal. The communication between the ship's host computer and the shore-based monitoring terminal includes: network messages processing based on Select multiplexing, network manager compiling, which at least includes the following functions as sticky packet subcontracting, data sending, heartbeat mechanism and event distribution. These terminals also carry out the data communication based on TCP network protocol with Socket to realize the network communication.

Firstly, the network message is processed based on Select multiplexing, and the network manager is compiled. The network manager at least includes following functions as solving sticky packet subcontracting, sending data completely, heartbeat mechanism and event distribution. Secondly, based on TCP network protocol, the connection between server and client is carried out for Socket communication, and realizes network communication between the ship's host computer and the shore-based monitoring terminal. Different types of data are stored with multi-source information reading-writing operation in a MySQL database.

Step5: The 3D display workstation is used to establish 3D scenes of marine engine room based on performance parameters and the characteristic parameters of static pictures, infrared thermal images, vibration & noise signals. Combined with pre-established 3D models of marine engine room, the 3D scenes can interact with each other and display a real scene of engine room through visual interfaces, which has more monitoring functions than conventional monitoring method. 3D models are used to realize 3D animation effect more intuitive than conventional alarm method when some parameters are out of limit, especially involving infrared thermal images of equipment as engine room water inflow, engine room firing, pirate invasion, electrical short circuit, etc.

To sum up, compared with conventional remote monitoring method, this remote monitoring method is designed based on information fusion and virtual reality technologies, which has the following characteristics:

1. Normalized relative deviation analysis method is used to detect typical failures of marine engine including intake filter blockage, intercooler fouling at water side, scavenging port fouling, clogged turbine nozzle, worn turbocharger bearing, turbine exhaust passage fouling, fuel pump wearing, fuel pipe leakage, etc. The influences of engine room temperature and intercooler cooling water temperature can be eliminated under different miming conditions throughout the entire engine working range.

2. Multi-scale time domain averaging method is used to convert engine room noise into sound pressure level and ship vibration signal into vibration intensity. Besides, fuzzy entropy feature extraction methods are also applied to extract signal waveforms in multiple periods and can be used to monitor ship accidents including Ship collision, rock hitting, machine loosening, propeller falling off, abnormal equipment.

3. Projection moment method is used to monitor engine room accidents including firing, water inflow, pirate invasion, electrical short circuit with image cameras and infrared thermal imagers, which not only increases shore-based personnel's perception of ship condition, but also make up for the lack of operators' attendance in autonomous unmanned ships.

4. 3D modeling technology is used to construct 3D scenes of marine engine room, which can truly reproduce actual operation scenes inside the marine engine room with immersive effect, making up for the shortage of awareness of future unmanned ships with shore-based remote monitoring method for marine engine room.

5. Transient impact signal analysis, instantaneous speed analysis, multi-scale time domain averaging and fuzzy entropy feature extraction methods are also applied to extract signal waveforms in multiple periods, retain fault features at all frequencies, and remove redundant information. With only characteristic parameters of static images and thermal images got from cameras and thermal imagers, the amount of real-time image transmission data is greatly decreased and the communication cost for maritime satellite is reduced, which makes this shore-based remote monitoring system more practical.

EMBODIMENTS

Figure 1:
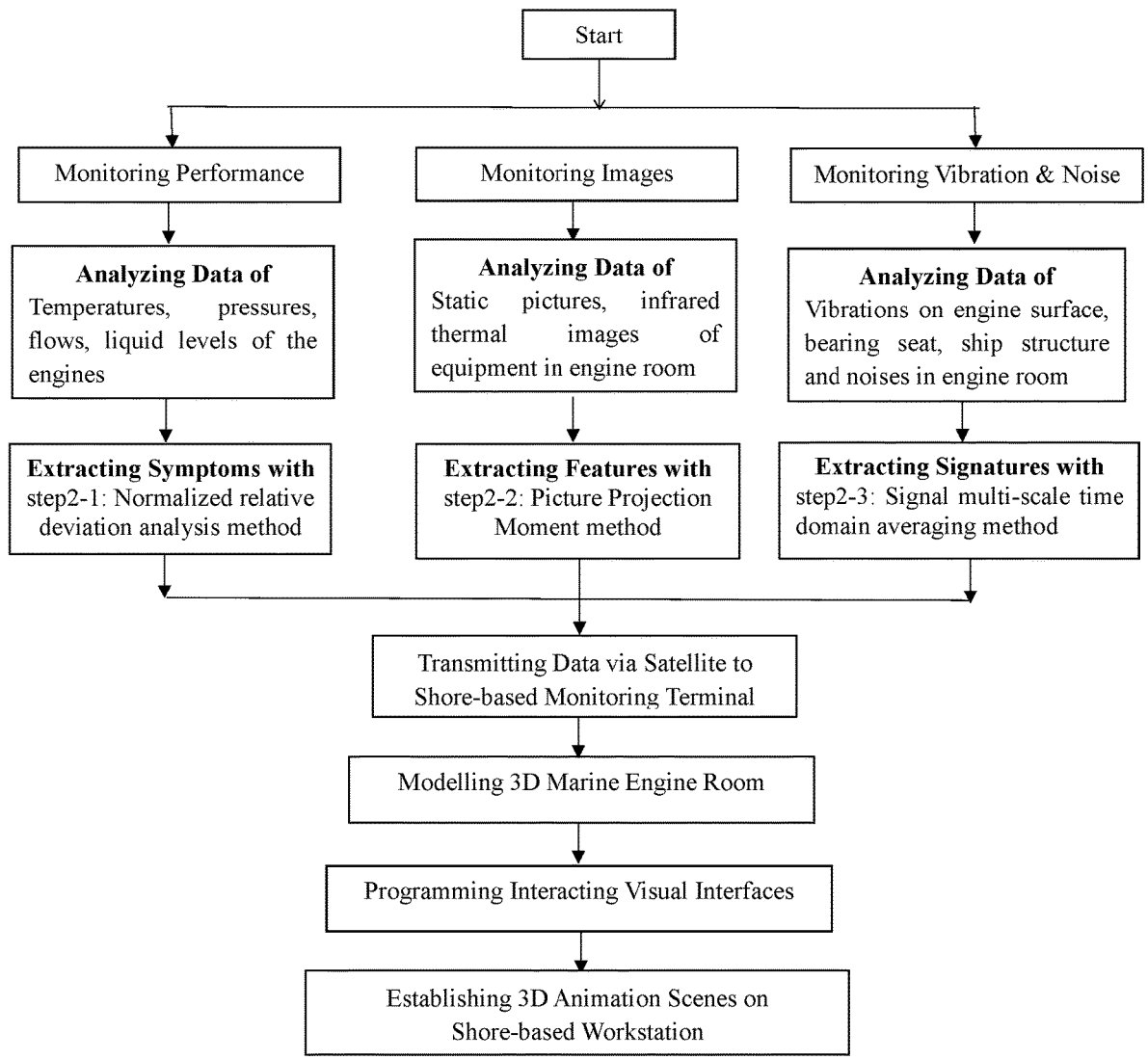
FIG. 1 is a flow chart of the remote monitoring method based on information fusion and virtual reality for a marine engine room of the present invention.

The remote monitoring method of the marine engine room disclosed in the present invention will be further described in details with reference to the attached FIGS. 1-2 and the specific embodiments below. The advantages and features of the present invention will become clearer from the following description. It should be noted that the drawings are in a simplified form, all of which use inaccurate descriptions, and are only used to explain the purpose of embodiments of the present invention conveniently and clearly. In order to make the objects, features and advantages of the present invention more obvious and easier to be understood, please refer to the attached drawings. It should be noted that the structures, proportions, sizes, etc. shown in the drawings in this specification are only used to match the contents disclosed in this specification for the people familiar with this technology to understand, and are not used to limit the implementation conditions of the present invention, so they have no technical significance. Any structural modification, change of proportion or adjustment of size should still be covered by the technical contents disclosed in the present invention, provided that it does not affect the effects and objectives that can be achieved by the present invention.

The core idea of the present invention is to propose a new remote monitoring method for a marine engine room according to the characteristics of autonomous unmanned ships. In this method, the existing sensors in engine room are used to obtain performance parameters including temperature, pressure, liquid level, rotating speed and other parameters of each system in the engine room as listed in Table 1. But conventional monitoring instruments, monitoring screens and extended alarm unit installed in bridge, public places, chief engineer's room and engineer's room will be dismantled. In order to make the operators ashore have actual operation situation of equipment in the marine engine room, 3D real-life models of marine engine room are built with 3D modeling technology and virtual reality technology. Cameras, infrared thermal cameras, cabin noise sensors and structural vibration sensors are installed in main engine room, steering gear room, oil separators room and generator room as listed in Table 2. With image recognition method, the firing, water inflow, pirate invasion, electrical short circuit can be automatically recognized from camera images, and engine room fire, firing range and severity can be automatically detected. With signal analysis method, engine room noise signal can be converted into sound pressure level, and ship vibration signal can be converted into vibration intensity. After feature extraction and data packaging, it will be sent to a shore-based communication unit together with other parameters via maritime satellite. After receiving the data, the shore-based communication unit unpack it and send it to shore-based monitoring terminals. Here, the thermal working parameters of marine engine room systems are displayed in conventional alarm list and two-dimensional monitoring interfaces. Besides, these monitoring data can be also sent to a 3D monitoring workstation through TCP protocol, so that the operation situation of marine engine room equipment can be monitored more intuitively.

Figure 2:
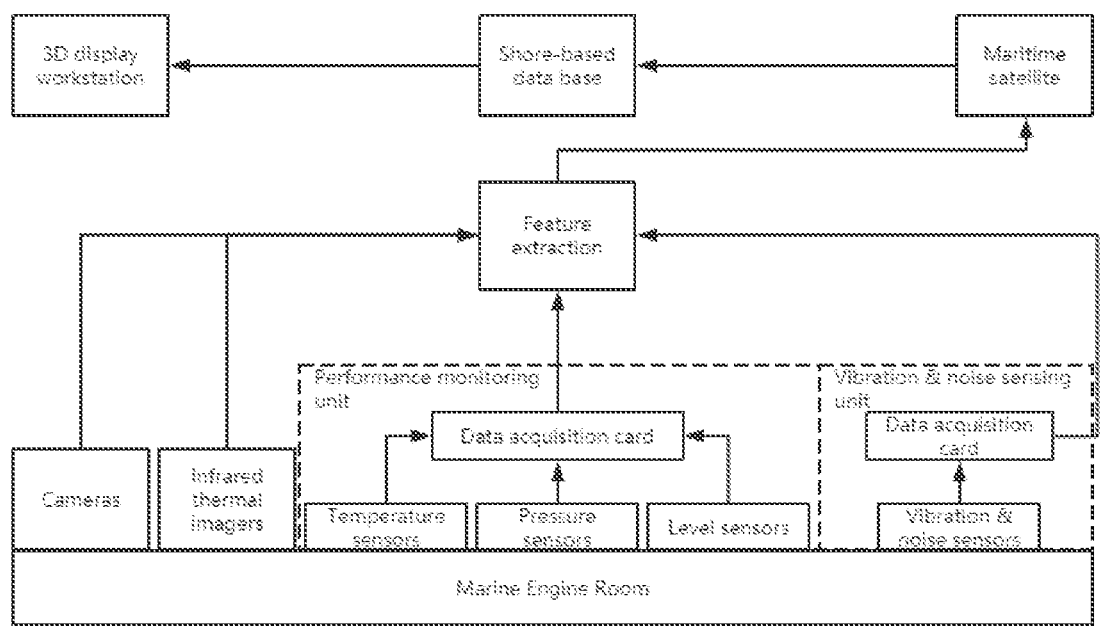
FIG. 2 is a schematic diagram of a remote monitoring system employed by the remote monitoring method based on information fusion and virtual reality for a marine engine room of the present invention.

Referring to FIG. 1 and FIG. 2, the present invention provides a new remote monitoring method for a marine engine room, which utilizes performance monitoring unit, engine room cameras, infrared thermal imagers, vibration & noise sensors, shore-based monitoring terminals and a 3D display workstation. The performance monitoring unit include a variety of sensors installed in marine engine room, the sensors are used to collect working parameters of main equipment in the marine engine room, and the performance monitoring unit are used to transmit the working parameters to a maritime satellite. The engine room cameras and infrared thermal imagers are used to acquire static pictures and infrared thermograms of marine engine room respectively, and transmit the parameters of static pictures and infrared thermal images to maritime satellite. The vibration & noise sensing unit include vibration & noise sensors installed in various parts of the marine engine room. The vibration & noise sensors are used for collecting vibration & noise signals of main equipment in the marine engine room, which will be feature extracted, packed and sent to the maritime satellite. The shore-based monitoring terminals are used for receiving these working parameters, static pictures and infrared thermograms parameters, vibration & noise signatures transmitted by maritime satellites and for transmitting them to the 3D display workstation. The 3D display workstation establishes 3D scenes of the marine engine room based on the working parameters, static pictures and infrared thermograms parameters, vibration & noise signatures, combined with the pre-established 3D models of the marine engine room. These 3D scenes can interact and be displayed through visual interfaces. According to the present invention, firstly, the virtual reality technology is used to construct scenes of marine engine room, which makes up for the intuitive lack of awareness in unattended marine engine room. Then, multi-sources information is obtained by using cameras, thermal imagers, vibration & noise sensors. Image recognition and signal processing methods are combined to get the characteristic parameters of these information and transmitted to shore base, which reduces amount of real-time image data transmission and enhances the perception information of the ship for shore-based operators, to adapt to the remote monitoring of autonomous unmanned ships in the future.

In the present invention, the method can be used for diesel engine typical performance failure detection. A normalized relative deviation analysis method is used to extract features of the diesel engine thermodynamic parameters; the specific process includes: set the parameter x to the normal scale of $x_0$ under normal condition $\varepsilon=(x-x_0)/x_0$, where x and $x_0$ are the thermodynamic parameters of the diesel engine model under failure and normal conditions, respectively. Then the relative deviation is normalized to the reference condition (286° K. engine room temperature) according to the actual engine room temperature t ° K. $\varepsilon'=(t-286)\times\varepsilon/114$. Finally the normalized thermodynamic parameter will be $x'=x/(1+\varepsilon')$;

In this way, the thermodynamic parameters of diesel engine under different running conditions and performance failures are analyzed in terms of relative deviation, which demonstrates the relationship between the performance failures and thermodynamic parameters. The influences of the engine room temperature and intercooler cooling water temperature can be eliminated and the performance failures could be detected according to the relative deviation of thermodynamic parameters under different running conditions throughout the entire engine working range.

In the present invention, the method can be used for ship accidents monitoring with cameras and infrared thermal imagers installed in engine room to regularly acquire static pictures and infrared thermograms in different parts of marine engine room, and applying image recognition methods are applied to monitor the accidents of machine moving, structure damage, water leakage, oil leakage, loose base and firing in the engine room, as well as water inflow, pirate invasion, electrical short circuit and so on. Among them, the monitoring unit can identify the images from infrared thermal imagers. For example, several frames of infrared flame images are superimposed in a sliding time window on a projection plane, and the dynamic characteristics of the flame are described by projection moments. The process is carried out in the following way:

Firstly, assume pi (i=1, 2, 3 . . . ) is a sequence of image frames continuously collected at equal intervals n frames of images are taken forward based on the currently collected image frames, and the flame target contours in these n frames of images are connected to form a 3D flame reconstruction stereo model. The 3D projections are superimposed on the normal plane in time sequence to obtain the following two-dimensional projection diagram. Different gray values in this figure reflect the frequency of flame targets appearing in this area. The part with the highest density is called flame core, and the probability of flame appearing in this area is the highest when it is closest to combustion object. The peripheral part of flame is an area where the combustion flame flashes randomly, and its distribution characteristics are related to the combustion object and combustion environment.

Then, based on the characteristics of target projection, Support Vector Machine (SVM) can be used to distinguish the flame and non-flame targets, and the characteristics of fire and smoke in engine room will be judged. The training set $T=\{(D_1, y_1) \ldots (D_i, y_i) \ldots (D_I, y_I)\} \ldots \in (D \times Y)^I$ is composed of feature vectors with several flame targets and pseudo targets, where $Di \in D=R^6$ is a six-dimensional feature vector. $yi \in Y=\{1, -1\}$ is a known sample where, "1" is flame indicator and "-1" is non-flame indicator. The sample number is $i=1, \ldots, I$. The input vector is mapped to a high-dimensional feature space by nonlinear mapping, and the optimal classification hyperplane is constructed in this space for classification. After all non-zeros of SVM are obtained, one or two kinds of classifiers will be formed. After the processing mentioned above, six feature vectors $\varphi 2 \sim \varphi 7$ are calculated for the suspected flame imaged by infrared filter, which are brought into a trained Support Vector Machine to obtain the flame recognition result.

In the present invention, vibration & noise monitoring unit regularly obtain the ship structure vibration, machine vibration, shafting instantaneous speed and engine room noise signals from vibration & noise sensors in different parts of ship structure, machine surface and propulsion shaft in marine engine room. Transient impulse signal analysis, instantaneous speed analysis, multi-scale time domain average and fuzzy entropy feature extraction methods are applied to extract signal signatures in multiple periods. Fault features at all frequencies are retained and redundant information are removed to monitor operational accidents including ship collision, rock hitting, machine loosening, propeller falling-off and abnormal equipment.

A multi-scale time domain averaging method is also used to enhance the signal-to-noise ratio of vibration signals of rotating machinery. The vibration signal z(t) of marine rotating machinery contains multiple periodic signals x(t), z(0=y(t)+e(t), where y(t) is a signal composed of r different periodic signals, and e(t) is an error component. Under a constant running speed, the number of samples between any two punctuations is a fixed value m. With in as the size of sub-signal array, z(t) is divided into p segments, the vibration signal is z(n), and the synchronous averaging algorithm in time domain is as:

$$z(n) = \frac{1}{p} \sum_{r=0}^{p-1} z(n - rM)$$

In this way, the noise components unrelated to the average parameter M are obviously weakened after synchronous averaging, and the selected periodic components can be enhanced by real-time domain synchronous averaging. For different periodic components, choose different fixed values M between two time points, and get the enhanced signals of different periodic signals, thus reducing the interference of noise in marine engine room.

Based on the existing monitoring method for marine engine room, the present invention uses virtual reality technology to construct 3D scenes of marine engine room, and puts forward the concept of shore-based remote monitoring method for autonomous unmanned ships marine engine room in the future. Besides the conventional parameters and monitoring functions, this method fully considers the characteristics of unmanned ships and shore-based remote monitoring in the future, which obtains static pictures, infrared thermal images, operating noise and ship vibration and keeps a look on the accidents of ships and engine rooms in time. In practical application, it is necessary for the 3D workstation to establish 3D models and 3D interactive scenes firstly. The actual working situation of marine engine room can be displayed on the interactive interfaces of 3D workstation. The establishing steps are as follows:

Step 1: The marine engine room is divided into main engine room, steering gear room, oil separators room and generators room, etc.

Step 2: The 3D engine room modeling is carried out with 3ds-Max and Unity 3D software separately, including the effect display of corresponding lights, instruments and alarms.

In the present invention, it is necessary to communicate between shore-based monitoring terminal and 3D display workstation, which is based on a variety of communication techniques including: network messages processing based on Select multiplexing, network manager compiling with Net Manager, network unit perfecting, subcontracting of sticky packet, complete data transmission, heartbeat mechanism, event distribution, etc. Network communication is realized between shore-based monitoring terminal and 3D display workstation in order to carry out Socket communication between server and client. Different types of data are stored with multi-source information read-write operation in MySQL database including asynchronous TCP connection, multiplexing processing, packet sticking and subcontracting processing, complete network data transmission and network parameter setting, etc.

In the present invention, the steps to realize the interaction of 3D scenes on the 3D workstation include: establishing a database including working condition parameters, characteristic parameters of static pictures and infrared thermograms, signatures of vibration & noise signals; Making the linkage between 3D models and database to realize 3D animation effect; Building UI interface with UGUI system embedded in Unity3D software in order to form visual interface on 3D workstation, which is used to display 3D animation effect. The script file is associated with 3D models, and the linkage of 3D models is realized by C# programming, so that the 3D model can act according to different parameters and achieve different 3D animation effects.

To sum up, the development and application of the present invention based on information fusion and virtual reality technologies can enhance the perception of shore-based remote monitoring method for marine engine room, as well as reduce the data communication and expenditure of ship-shore communication. Moreover, the conventional monitoring screens and extended alarm unites in marine engine room can be dismantled, which are replaced by shore-based remote monitoring terminals and 3D display workstation to meet the requirements of autonomous unmanned ships in the future. Furthermore, the dynamic characteristics of images are described and judged with SVM to monitor the possible firing, water inflow, pirate invasion, electrical short circuit instead of personal inspection in marine engine room. Finally, with the analysis of ship vibration & noise, transient impact analysis, instantaneous speed analysis, multi-scale time domain average and fuzzy entropy feature extraction the major ship accidents could be automatically judged by shore-based monitoring terminals.

Although the present invention has been described above in details, it should be recognized that the description may not be considered as a limitation of the present invention.

Some modifications and substitutions of the present invention will be apparent to those skilled readers. Therefore, the scope of protection of the present invention should be defined by the appended claims.

TABLE 1

Performance parameters in marine engine room

| ITEM | DESCRIPTION |
| --- | --- |
| PT1501 | Top bracing accumulator pressure |
| PT8001 | Fuel oil inlet |
| PT8103 | Lubricating oil inlet to turbo charger |
| PS8103 | Lubricating oil inlet to turbo charger |
| PT8108 | System lubricating oil inlet |
| PT8108-1 | Piston cooling oil inlet |
| PS8109 | Lub. oil inlet to main bearing and thrust bearing |
| PS8109-1 | T.V.D. lub. oil inlet pressure |
| PT8505 | Air inlet to air cylinder for exhaust valve |
| PT8401 | Jacket cooling water inlet(at inlet manifold) |
| PDT8404 | Jacket cooling water across cylinder liners |
| PDT8405 | Jacket cooling water across cylinder covers |
| PT8413 | Jacket cooling water outlet |
| PT8421 | Cooling water inlet scavenge air cooler |
| PT8501-1 | Starting air inlet |
| PT8501-2 | Starting air inlet |
| PT8503-1 | Control air inlet |
| PT8505 | Air spring for exhaust valve |
| PT8601-1 | Scavenge air receiver |
| PDS1231 | Lub. oil difference pressure across auto filter |
| TE1270 | HPS bearing |
| TE8005 | Fuel oil inlet(Refer to fuel oil maker |
| TE8106 | Thrust bearing segment |
| TS8107 | Thrust bearing segment |
| TE8112 | System lubricating oil inlet |
| TE8113 | Piston cooling oil outlet/cyl |
| TE8117 | Lubricating oil outlet T/C |
| TE8202 | Cylinder lub. oil inlet |
| TE8407 | Jacket cooling water inlet |
| TT8408 | Jacket cooling water outlet liner |
| TT8408 | Jacket cooling water outlet liner |
| TE8410 | Cylinder cooling water outlet cover |
| TE8422 | Cooling water inlet air cooler |
| TE8423 | Air cooler cooling water outlet |
| TE8605 | Scavenge air before air cooler/air cooler |
| TE8608 | Scavenge air after air cooler/air cooler |
| TE8609 | Scavenge air receiver |
| TE8610 | Scavenge air box fire~alarm/cyl |
| TE8701 | Exhaust gas before T/C |
| TE8702 | Exhaust gas after exhaust valve/cyl |
| TE8704 | Exhaust gas temp. in receiver |
| TE8707 | Exhaust gas outlet T/C |
| LS8006 | Leakage from high pressure pipes |
| XC8212 | Low level small box for cylinder lub. oil heating element |
| TS8213 | Cylinder lubricating heating |
| LS8611 | Water mist catcher-water level |
| FS8114 | Piston cooling oil outlet each cyl |
| LS4112 | Leakage from cylinder units/pipe |
| XS8815 | Instantaneous rotating speed on propulsion shaft |

TABLE 2

Cameras, Noise & Vibration Sensors Installed in Marine Engine Room

| ITEM | DESCRIPTION |
| --- | --- |
| VI01 | Vibration on main diesel engine seat in vertical direction |
| VI02 | Vibration on 1# generator diesel engine seat in vertical direction |
| VI03 | Vibration on 1# generator diesel engine seat in vertical direction |
| VI04 | Vibration on 1# generator diesel engine seat in vertical direction |
| VI05 | Vibration on stern-tube propulsion bearing seat in horizontal direction |
| VI06 | Vibration on midship section in horizontal direction |
| VI07 | Vibration on shell expansion in horizontal direction |
| VI08 | Vibration on side construction in fore cargo hold in horizontal direction |

TABLE 2-continued

Cameras, Noise & Vibration Sensors Installed in Marine Engine Room

| ITEM | DESCRIPTION |
| --- | --- |
| VI09 | Vibration on side construction in mid cargo hold in horizontal direction |
| VI10 | Vibration on side construction in aft cargo hold in horizontal direction |
| VI11 | Vibration on CH1 cargo hold construction in horizontal direction |
| VI12 | Vibration on CH2 cargo hold construction in horizontal direction |
| VI13 | Vibration on CH3 cargo hold construction in horizontal direction |
| VI14 | Vibration on CH4 cargo hold construction in horizontal direction |
| VI15 | Vibration on transverse bulkhead in cargo hold (#90) in horizontal direction |
| VI16 | Vibration on transverse bulkhead in cargo hold (#122) in horizontal direction |
| VI17 | Vibration on transverse bulkhead in cargo hold (#155) in horizontal direction |
| VI18 | Vibration on transverse bulkhead in cargo hold (#187) in horizontal direction |
| VI19 | Vibration on fore end construction in horizontal direction |
| VI20 | Vibration on aft end construction in horizontal direction |
| VI21 | Vibration on deck 8 & walls below in horizontal direction |
| VI22 | Vibration on bulwark structure in horizontal direction |
| VI23 | Vibration on bilge keel in vertical direction |
| NS01 | Noise in main engine room |
| NS02 | Noise in separator room |
| NS03 | Noise in generator room |
| NS04 | Noise in steering gear room |
| NS05 | Noise in air compression room |
| VD01 | Camera in main engine room |
| VD02 | Camera in separator room |
| VD03 | Camera in generator room |
| VD04 | Camera in steering gear room |
| VD05 | Camera in air compression room |

The invention claimed is:

1. A remote monitoring method based on information fusion and virtual reality for a marine engine room, comprising the following steps:

step1: employing temperature sensors, pressure sensors and level sensors to collect thermodynamic parameters; employing engine room cameras, infrared thermal imagers to collect marine engine room images; employing acceleration sensors to collect vibration & noise signals; transferring data of the above sensors' data by means of a data acquisition card to a host computer; connecting signal lines between the host computer and the data acquisition card; connecting signal lines between the data acquisition card and the sensors; connecting signal lines between the engine room cameras and infrared thermal imagers to the host computer; supplying power supply via a power source to the host computer, the data acquisition card, the engine room cameras and the infrared thermal imagers; and then turning on a power source;

step2-1: using normalized relative deviation analysis method to obtain symptoms of the thermodynamic parameters including temperatures, pressures, flows, liquid levels of the engine;

the specific process of the normalized relative deviation analysis method is as follows: for a thermodynamic parameter x alternatively representing temperature, pressure, running speed, flow or liquid level of the engine; setting the thermodynamic parameter x to its normal scale $x_0$ under normal condition as $\varepsilon=(x-x_0)/x_0$, wherein x and $x_0$ being the thermodynamic parameters of the diesel engine under failure and normal conditions, respectively; normalizing relative deviation to a reference condition of 286° K engine room temperature according to actual engine room temperature t ° K, wherein ε'=(t−286)×ε/114; normalizing thermodynamic parameter as x'=x/(1+ε');

step2-2: using multi-scale time domain averaging method to extract signatures of vibration & noise signals on engine surface, bearing seat, ship structure and noises in the engine room; the specific process of the multi-scale time domain averaging method is as follows: setting a vibration signal z(t) of marine rotating machinery to contain multiple periodic signals y(t), z(t)=y(t)+e(t), y(t) being a signal composed of r different periodic signals, and e(t) being an error parameter; under condition of constant speed, a number of samples between any two punctuations being a fixed value M, with M being the size of a sub-signal array; dividing z(t) into p segments to obtain a sampling signal of vibration signal as $$z(n) = \frac{1}{p}\sum_{r=0}^{p-1} z(n - rM);$$

step2-3: using projection moment method to describe dynamic characteristics of static pictures, infrared thermal images of multiple pieces of equipment in the engine room; the specific process of the projection moment method is as follows: superimposing several infrared thermograms in sliding time window on a projection plane; saving the extracted features of image color, size and location in the host computer;

step3: extracting features in the performance parameters, infrared thermal images of the multiple pieces of equipment in the engine room as water inflow, engine room firing, pirate invasion, electrical short circuit; applying transient impact signal, instantaneous speed, multi-scale time domain averaging and fuzzy entropy feature extraction methods to extract signal waveforms in multiple periods, retaining fault features at all frequencies, and removing redundant information in a 3D display workstation;

step4: transmitting the analyzed results of the performance symptoms, extracted features of the images and vibration signatures to a shore-based monitoring terminal as follows: processing network messages based on select multiplexing, compiling network manager, which at least includes the following functions of: sticky packet subcontracting, data sending, heartbeat mechanism and event distribution; carrying out data communication based on TCP network protocol with Socket to realize the network communication;

step5: establishing visual 3D scenes of the marine engine room based on the performance parameters including temperatures, pressures, running speeds, flows, liquid levels of the systems and the characteristic features of the static pictures, infrared thermal images, vibration & noise signatures; in combination with pre-established 3D models of the marine engine room, interacting the 3D scenes with operators and displaying a real scene of the engine room through the visual interfaces.

* * * * *